Figure 2:
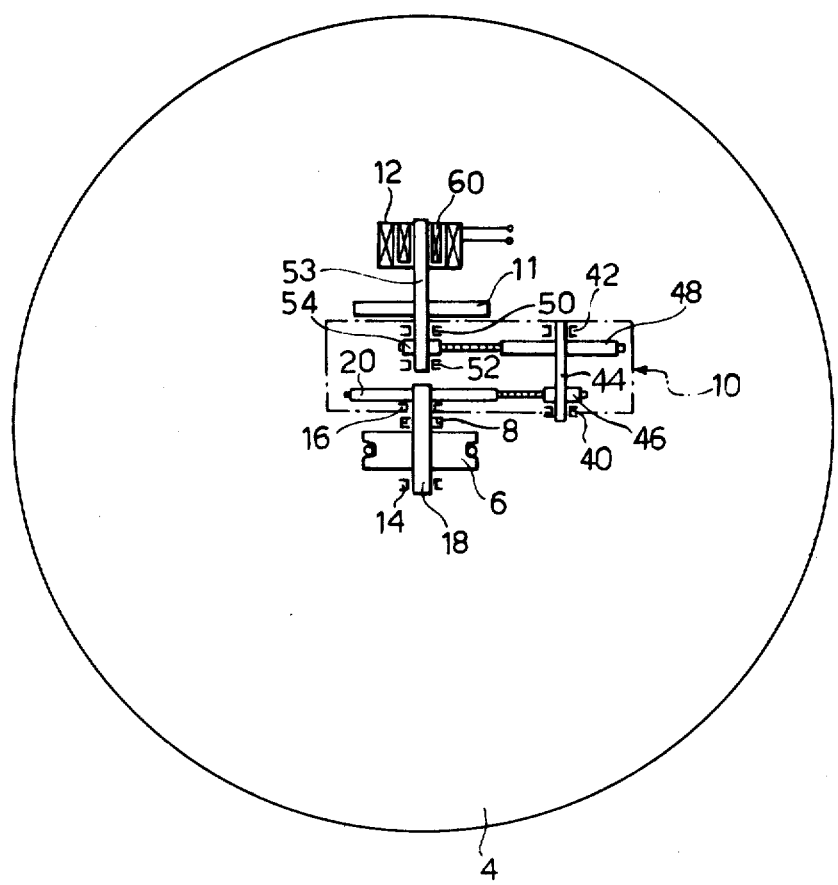

United States Patent

Quilico et al.

[11] 4,242,593
[45] Dec. 30, 1980

[54] DEVICE FOR CONVERTING SEA WAVE ENERGY INTO ELECTRICAL ENERGY

[75] Inventors: Carlo A. Quilico; Paolo M. Troya, both of Turin, Italy

[73] Assignee: FIAT Societa per Azioni, Turin, Italy

[21] Appl. No.: 959,272

[22] Filed: Nov. 9, 1978

[30] Foreign Application Priority Data

Nov. 21, 1977 [IT] Italy .................. 69620 A/77

[51] Int. Cl.³ .................................. F03B 13/12
[52] U.S. Cl. ............................... 290/53; 290/42
[58] Field of Search ........................... 290/42, 53

[56] References Cited

U.S. PATENT DOCUMENTS

| | | | |
|---|---|---|---|
| 3,567,953 | 3/1971 | Lord | 290/53 X |
| 3,894,241 | 7/1975 | Kaplan | 290/53 X |
| 3,922,013 | 11/1975 | Tidwell | 290/53 |

Primary Examiner—Gene Z. Rubinson
Assistant Examiner—W. E. Duncanson, Jr.
Attorney, Agent, or Firm—Sughrue, Rothwell, Mion, Zinn & Macpeak

[57] ABSTRACT

A device for converting sea wave energy into electrical energy comprises a floating platform carrying a pulley which is connected through a free-wheel coupling and a speed multiplier to a drive shaft of an electrical generator, on which a flywheel is mounted. An anchor cable passes over the pulley and suspends at its free end an immersed counterweight so that vertical motion of the platform in the sea causes rotation of the pulley and drives the generator continuously.

12 Claims, 2 Drawing Figures

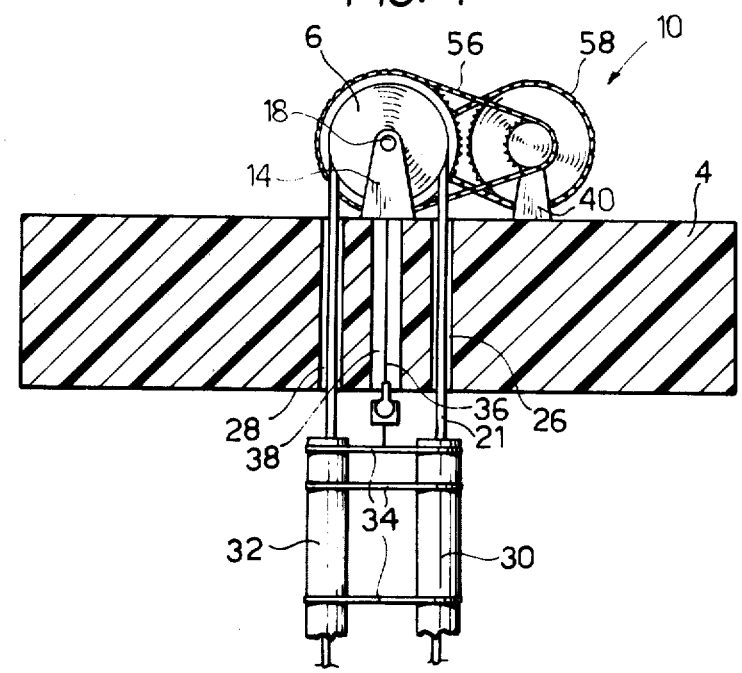
FIG. 1
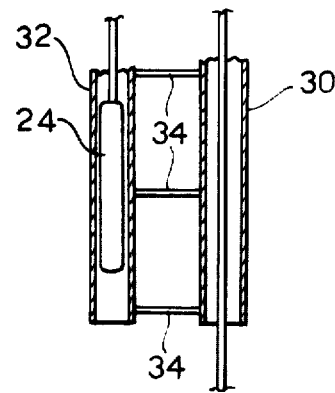
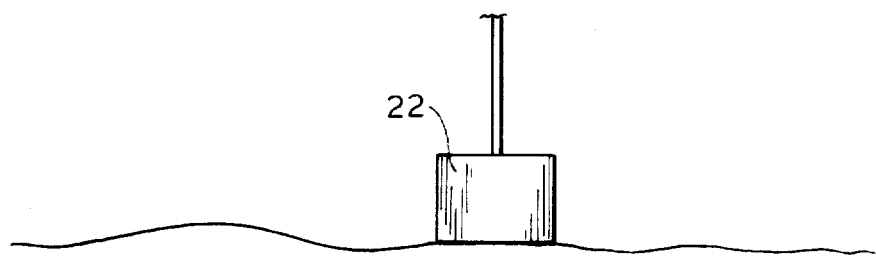

DEVICE FOR CONVERTING SEA WAVE ENERGY INTO ELECTRICAL ENERGY

The present invention relates to a device for converting sea wave energy into electrical energy.

The object of the present invention is to provide a device whereby wave motion of the sea can be converted into electrical energy. A further object of the invention is to provide such a device which combines moderate efficiency with ease of construction and maintenance.

According to the present invention there is provided a device for converting sea wave energy into electrical energy, characterised in that the device comprises a floating platform anchored dynamically to the sea bed in use of the device by anchoring means cooperating with means on said platform for converting linear movement of the platform relative to the anchoring means into rotation of a shaft supported on the platform, and an electrical generator mounted on the platform and arranged to be driven by the shaft.

In a preferred embodiment of the invention the anchoring means comprise a cable and the means for converting the movement of the platform into rotation of the shaft comprises a pulley over which the cable passes, the pulley being mounted on the said shaft.

In use of the device of the present invention the vertical displacement of the platform resulting from the natural sea wave motion causes rotation of the shaft which in turn drives the generator to give a useful electrical output.

The invention will now be described, by way of example, with reference to the accompanying drawings, in which:

FIG. 1 is a partial vertical cross-section of a device according to one embodiment of the invention, and FIG. 2 is a diagrammatic plan view of the device shown in FIG. 1.

Referring to FIG. 1, reference numeral 4 indicates a floating platform comprising a glass fibre reinforced synthetic resin shell filled internally with an expanded plastics material, in accordance with known practice in the design of recreational water craft. The platform 4 is of substantially cylindrical shape, floating with its axis vertical. The internal diameter of the platform 4 is typically about 4 meters and its internal height is about 0.5 meter.

The upper part of the floating platform 4 carries energy conversion apparatus which includes a pulley 6 mounted on a shaft 18 to which a free wheel coupling 8 is connected. The pulley shaft 18 is coupled to a rotational speed multiplier indicated generally by 10, affording a drive output of higher rotational speed than the drive input through the free-wheel coupling 8. The multiplier 10 has an output shaft 53 on which a flywheel 11 is mounted. The shaft 53 drives a current generator 12.

The upper part of the floating platform 4 carries a first pair of support brackets 14 and 16 which support the rotary shaft 18 on which the pulley 6 is keyed. The free-wheel coupling 8 engages the shaft 18 and a first toothed wheel 20 forming part of the multiplier 10 is keyed on the shaft 18.

The free-wheel coupling 8 is arranged to couple the toothed wheel 20 to the pulley 6 on rotation of the pulley 6 in one direction and to disengage the toothed wheel 20 from the pulley 6 on rotation of the pulley 6 in the opposite direction. The coupling 8 is furthermore designed so that when the torque applied to the coupling 8 exceeds a predetermined limit torque the coupling 8 will disengage the connection between the pulley 6 and the first toothed wheel 20 of the multiplier 10.

A cable 21 is located in the groove of the pulley 6, one end of the cable 21 being connected to an anchor block 22 placed on the sea bed and the other end being connected to a submerged counterweight, indicated generally 24, such as to prevent any drifting movement of the said floating platform and to ensure a constant tension in the cable 21.

The cable 21 also passes through two through bores 26 and 27 formed in the floating platform 4 and through two hollow vertical guide cylinders 30 and 32. The counterweight 24 is freely movable within one of the cylinders, 32. The two cylinders 30 and 32 are suspended below the said floating platform 4 and are maintained fixed relative to each other by means of a series of transverse tie members 34 fixed to the two cylinders.

The two cylinders 30 and 32 are suspended below the said floating platform 4 by means of a cable 36 which passes through a bore 38 in the said platform 4. One end of the cable 36 is attached to the said floating platform 4 and the other end is attached to the uppermost of the tie members 34 which unite the cylinders 30 and 32.

Two upstanding brackets 40 and 42, similar to the brackets 14 and 16, are fixed to the upper surface of the floating platform 4. The brackets 40 and 42 support a layshaft 44 on which second and third toothed wheels 46, 48 of the rotary speed multiplier 10 are keyed.

A final pair of upstanding support brackets 50 and 52, also similar to the brackets 14 and 16, is fixed to the upper surface of the floating platform 4, these brackets 50 and 52 supporting the output shaft 53 to which are keyed a fourth toothed wheel 54 of the speed multiplier 54, the flywheel 11, and the rotor 60 of the current generator 12.

The first and second toothed wheels 20 and 46 of the speed multiplier 10, and the third and fourth toothed wheels 48 and 54, are drivingly coupled by respective endless toothed belts 56 and 58. Each of the toothed belts 56 and 58 has an associated belt tensioner, not shown, for the purpose of maintaining a desired tension in each toothed belt.

The pulley 6, the toothed wheels of the multiplier 10, the flywheel 11 and the rotor 60 of the current generator 12 may be securely connected to the respective shafts on which they are mounted by the insertion of a series of feather keys between the shafts and these respective parts.

The operation of the device in accordance with the invention will now be described.

Displacements of the floating platform 4 upwards by wave motion will be considered as the useful or working movements. When the floating platform 4 rises due to natural sea wave motion, the cable 21 is drawn downwards in the bore 26 and rotates the pulley 6 in the clockwise direction as viewed in FIG. 1. This rotation of the pulley 6 is transmitted to the first toothed wheel 20 of the speed multiplier 10 through the free-wheel coupling 8, causing corresponding rotations, with increased angular velocity, of the other three toothed wheels 46, 48 and 54 of the multiplier 10. The output shaft 53 of the speed multiplier 10 therefore rotates the flywheel 11 and drives the rotor 60 of the current generator 12, the said flywheel 11 acting as an accumulator of the rotational kinetic energy imparted to it, while the rotation of the rotor 60 within the stator of the generator 12 effectively transforms the rotary motion of the shaft 53 into electrical energy.

When the floating platform 4 descends under the influence of the wave motion, the counterweight 24 pulls the cable 21 downwards through the bore 28, rotating the pulley 6 in the anti-clockwise direction as viewed in FIG. 1, that is, in the opposite direction to that in which the pulley 6 is rotated upon upward movement of the floating platform 4. Upon such rotation of the pulley 6 the coupling 8 free-wheels, so that the rotation of said pulley 6 is not transmitted to the speed multiplier 10 or to the generator 12 connected to it.

The initial rotation imparted to the rotor 60 of the generator 12 by the sea wave motion during the ascending movement of the floating platform 4 would tend to diminish when torque ceases to be transmitted through the coupling 9 during the subsequent descending movement of the platform 4. The kinetic energy stored in the flywheel 11 during the ascent of the platform 4 is, however, imparted to the shaft 53 when the coupling 9 free-wheels, thereby maintaining the rotor 60 of the generator 12 in rotation in the same direction. Consequently, the generator 12 produces an electrical output continuously, deriving its energy from each ascending component of the sea wave motion imparted to the floating platform 4, while the flywheel 11 acts in effect to smooth the cyclic drive imparted to the rotor 60 by these wave components.

The current output of the generator 12 is passed to a load (not shown).

The device of the present invention affords a means of converting the energy of sea waves into electrical energy with moderate efficiency without recourse to complex and expensive plant.

For optimum operation the illustrated device according to the invention should be operated in a depth of water greater than 50 meters, to avoid heavy billows breaking over the device and causing damage.

In cases where the sea wave motion is slight and the average height of the waves is less than the most optimum value for efficient operation of the device, the device will operate with reduced efficiency and will generate significantly less electrical energy.

When, on the other hand, the device operates in a heavy sea, where the average height of the waves is greater than the optimum height for efficient operation of the device, damage to the device as a result of the absorption of a greater amount of energy than it is designed for is avoided, since the coupling 8, on being subjected to a torque greater than the said predetermined limit torque, automatically disengages the connection between the pulley 6 and the first sprocket wheel 20 of the speed multiplier 10, protecting the multiplier and the rotor of the generator 12 from the excessive stresses which otherwise would be imposed on them by the movements of the floating platform 4.

I claim:

1. A device for converting sea wave energy into electrical energy comprising a floating platform, a shaft rotatably supported on said platform, a pulley mounted on said shaft for rotation therewith, a cable extending over said pulley, means for anchoring one end of said cable to the sea bed during use of the device, a counterweight secured to the opposite end of said cable, two hollow cylinders secured to and extending downwardly from said platform with their axes perpendicular to said platform in which said cable is guided on opposite sides of said pulley with said counterweight being movably disposed within one of said hollow cylinders, and electrical generator means mounted on said platform and operatively connected to said shaft to be driven thereby.

2. A device as defined in claim 1, including a free-wheel coupling interposed between said pulley and the generator for the transmission of drive to the generator upon movement of the cable relative to the platform in one direction only.

3. A device as defined in claim 2, wherein the free-wheel coupling is adapted to disengage the pulley from the generator when the torque applied to the coupling exceeds a predetermined torque.

4. A device as defined in claim 3, wherein the shaft on which the pulley is mounted carries a first toothed wheel of the rotational speed multiplier.

5. A device as defined in claim 1, including a rotational speed multiplier (10) through which the pulley is connected to the generator.

6. A device as defined in claim 4, wherein the rotational speed multiplier has an output shaft connected to the generator and wherein a flywheel is mounted on the output shaft.

7. A device as defined in claim 5, wherein the rotational speed multiplier comprises a plurality of toothed wheels and endless toothed belts interconnecting said wheels.

8. A device as defined in claim 6 wherein the output shaft carries a final toothed wheel of the rotational speed multiplier.

9. A device as defined in claim 6 or claim 8, including brackets mounted upon the platform and supporting respectively the said shaft carrying the pulley and the said output shaft carrying the flywheel and driving the generator.

10. A device as defined in claim 1, wherein the counterweight is immersed in the sea below the platform in use of the device.

11. A device as defined in claim 1, wherein the cylinders are disposed below the floating platform and are immersed in the sea in use of the device.

12. A device as defined in claim 1, including transverse tie members connected to the two cylinders and rigidly connecting them together.

* * * * *